Patented Dec. 26, 1950

2,535,086

UNITED STATES PATENT OFFICE 2,535,086

CYCLOPENTYL-(2-METHYLALLYL)-ACETIC ACID

Robert B. Moffett, Kalamazoo, Mich., and Charlotte Anne Hart, Kansas City, Mo., assignors to George A. Breon and Company, Kansas City, Mo., a corporation of Missouri No Drawing. Application February 8, 1949, Serial No. 75,303

2 Claims. (Cl. 260—514)

This invention relates to cyclopentyl-(2-methylallyl)-acetic acid having the formula

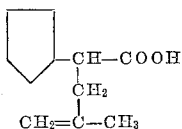

and to salts thereof.

These substances of our invention are useful as intermediates for preparing antispasmodics. Moreover, the free acid and its salts with non-toxic cations are also useful as bile flow stimulants. A water-soluble salt is particularly adapted for the latter purpose, and such a salt is prepared by reaction of the acid with an equivalent amount of an appropriate base, preferably an alkali metal hydroxide, carbonate or bicarbonate.

Our new compounds can be prepared as described in the following example.

Example (a) *Diethyl cyclopentyl-(2-methylallyl)-malonate.*—To a stirred suspension of 5.75 g. (0.25 m.) of powdered sodium in 50 ml. of dry toluene was slowly added 57 g. of diethyl cyclopentylmalonate. After nearly all of the sodium had reacted at reflux temperature, 34 g. (0.375 m.) of 2-methylallyl chloride was added dropwise and the mixture was refluxed for sixteen hours. After cooling, the mixture was neutralized with dilute acetic acid, and the toluene layer was washed with water, dried over anhydrous sodium sulfate and concentrated. The residue was distilled at reduced pressure, first through a Claisen head and then redistilled through an efficient fractionating column. The product distilled at 71° C. (0.01 mm.), giving 49.5 g. of diethyl cyclopentyl-(2-methylallyl)-malonate; $n_D^{25}=1.4613$; $d_4^{25}=1.0170$.

$M_D$ (molar refraction): Calcd. for $C_{16}H_{26}O_4$, 76.75; found, 76.32.

(b) *Cyclopentyl-(2-methylallyl)-acetic acid.*—A mixture of 42 g. (0.486 m.) of diethyl cyclopentyl-(2-methylallyl)-malonate with a solution of 40 g. of potassium hydroxide in 100 ml. of ethanol was heated in a bomb at 140–150° C. for three hours. After cooling, most of the alcohol was distilled off, water was added to the residue and the whole neutralized with hydrochloric acid. The substituted malonic acid was extracted with ether, and the ether extracts were washed with water and with saturated sodium chloride solution containing a little sodium bicarbonate, and finally dried over anhydrous sodium sulfate. The ether was then distilled off and the residue heated to 170° C. until carbon dioxide ceased to be evolved. Distillation at reduced pressure gave 15 g. of cyclopentyl-(2-methylallyl)-acetic acid, B. P. 86° C. (0.04 mm.); $n_D^{25}=1.4694$; $d_4^{25}=0.9768$.

Calcd. for $C_{11}H_{18}O_2$: N. E. (neutral equivalent), 182.25; $M_D$, 51.92. Found: N. E., 180.1; $M_D$, 51.98.

When cyclopentyl-(2-methylallyl)-acetic acid is treated with a solution of one equivalent of sodium hydroxide or sodium carbonate or sodium bicarbonate, sodium cyclopentyl-(2-methylallyl)-acetate is produced in solution and can be isolated by evaporation of the solution.

The instant application is a continuation in part of our prior U. S. patent application, Serial No. 643,480, filed January 25, 1946, now abandoned.

We claim:

1. A member of the group consisting of cyclopentyl-(2-methylallyl)-acetic acid having the formula

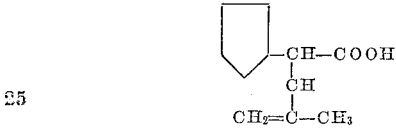

and non-toxic salts of said acid.

2. Cyclopentyl-(2-methylallyl)-acetic acid having the formula

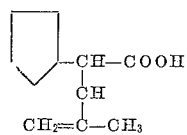

ROBERT B. MOFFETT.
CHARLOTTE ANNE HART.

REFERENCES CITED

The following references are of record in the file of this patent:

UNITED STATES PATENTS

| Number | Name | Date |
| --- | --- | --- |
| 1,677,123 | Adams | July 17, 1928 |
| 1,715,052 | Adams | May 28, 1929 |

FOREIGN PATENTS

| Number | Country | Date |
| --- | --- | --- |
| 728,998 | France | July 19, 1932 |

OTHER REFERENCES

Perkins et al., J. Am. Chem. Soc., vol. 49, pp. 517–522 (1927). (Copy in Sci. Library.)